United States Patent Office 2,697,098
Patented Dec. 14, 1954

2,697,098

PROCESS FOR PREPARING DITHIOCARBAMIC ACID DERIVATIVES

William W. Levis, Jr., Wyandotte, Mich., assignor to Sharples Chemicals Inc., a corporation of Delaware No Drawing. Application December 28, 1950, Serial No. 203,233

8 Claims. (Cl. 260—302)

The present invention relates to a process for the preparation of thiazolyl and thiazolinyl dithiocarbamates. It provides an improved process by which compounds of this type are obtained in a single-stage reaction involving (1) mercaptides of 2-mercaptothiazoles and 2-mercaptothiazolines, (2) secondary amines, (3) inorganic bases, and (4) thiophosgene.

By the process of the present invention, excellent yields of the various arylothiazolyl (such as benzothiazolyl) dithiocarbamates are attained regardless of whether the aryl nucleus is substituted or unsubstituted. Likewise other thiazolyl dithiocarbamates and thiazolinyl dithiocarbamates, whether substituted or unsubstituted, may be prepared in good yield.

The reaction is believed to involve equivalent quantities of the various reactants, the reactants which are employed and the structure of the products thus obtained being illustrated by the following chemical equation:

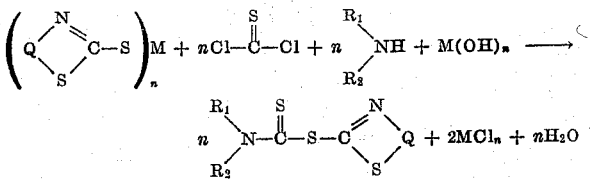

wherein Q represents a bivalent radical attached by adjacent carbon atoms to the N and the S, respectively, in completion of the characteristic, 5-atom heterocyclic ring, said radical being chosen from the group consisting of vinylene radicals, alkylene radicals, and arylene radicals in which each valence normally satisfied by hydrogen is satisfied by one of a group consisting of hydrogen, alkyl, halogen, and nitro; wherein $R_1$, taken individually, represents one of the group consisting of alkyl, aralkyl, aryl, and alkaryl radicals; wherein $R_2$, taken individually, represents one of the group consisting of alkyl and aralkyl radicals; and wherein $R_1$ and $R_2$, taken collectively, represent one of the group consisting of polymethylene and oxapolymethylene radicals; wherein M represents one of the group consisting of alkali metals and alkaline earths; and wherein $n$ is an integer equal to the valence of M.

With respect to M, examples of alkali metals are sodium and potassium; and examples of alkaline earths are calcium, magnesium, strontium, and barium.

The secondary amines employed in the reaction are those in which the nitrogen atom is twice substituted, for example, by alkyl, aryl, aralkyl, alkaryl, or combinations of the same, or by polymethylene, or by oxapolymethylene, except that diaryl, dialkaryl and arylalkaryl amines are preferably excluded. Thus within the scope of the present invention, for example, there may be used secondary amines in which the nitrogen is twice substituted by similar alkyl groups such as dimethyl, diethyl, dipropyl, dibutyl, diamyl, dihexyl, diheptyl, dioctyl, dinonyl, didecyl, diundecyl, didodecyl, ditridecyl, ditetradecyl, dipentadecyl, dihexadecyl, diheptadecyl, dioctadecyl, etc.; or by two dissimilar alkyl groups, such as methyl-ethyl, ethyl-propyl, methyl-propyl, ethyl-amyl, ethyl-octyl, hexyl-octyl, butyl-dodecyl, ethyl-tetradecyl, methyl-hexadecyl, methyl-octadecyl, dodecyl-octadecyl, etc.; or by a single polymethylene group such as pentamethylene, hexamethylene, etc.; or by a single oxapolymethylene group such as 3-oxapentamethylene, etc.; or by one aryl and one alkyl group, such as phenyl-methyl, phenyl-ethyl, phenyl-propyl, beta naphthyl-methyl, etc.; or by one alkyl and one alkaryl group, such as methyl-tolyl, ethyl-tolyl, propyl-tolyl, methyl-xylyl, ethyl-xylyl, propyl-xylyl, etc.; or by one alkyl and one aralkyl group, such as methyl-benzyl, ethyl-benzyl, propyl-benzyl, methyl-phenylethyl, ethyl - phenylethyl, propyl - phenylethyl, amyl - benzyl, tetradecyl-benzyl, etc.; or by one aryl and one aralkyl group, such as phenyl-benzyl, phenyl-phenylethyl, etc.; or by two aralkyl groups, such as dibenzyl, benzyl-phenylethyl, diphenylethyl, etc.; or by one aralkyl and one alkaryl group, such as benzyl-tolyl, phenylethyl-tolyl, benzyl-xylyl, phenylethyl-xylyl, etc.

Preferably the number of carbon atoms per radical attached to the nitrogen atom of the secondary amines does not exceed 18, and more particularly does not exceed 12.

Of particular interest are the thiazolyl and thiazolinyl dithiocarbamates in which the carbamate nitrogen is substituted by a pentamethylene group, or by a 3-oxapentamethylene group, or by two similar or dissimilar alkyl groups containing from 1 to 18 carbon atoms in each alkyl radical.

The mercaptothiazoles and mercaptothiazolines react in the form of the mercaptide, which may be introduced into the reaction zone as such or may be formed in situ. They include the mercaptides of 2-mercaptoarylothiazoles in which the arylene group may be either mono- or polynuclear and may furthermore be substituted by such relatively unreactive groups as halogen, alkyl, and nitro. Likewise analogous to the described mercaptides of mercaptoarylothiazoles, moreover, are the mercaptides of the alkyl substituted mercaptothiazoles and thiazolines. Typical compounds are the mercaptides of 2-mercaptobenzothiazole, 2-mercapto-5-nitrobenzothiazole, 2-mercapto-6-chlorobenzothiazole, 2-mercaptonaphthothiazole, 2-mercapto-4-methylthiazole, 2-mercaptothiazoline, 2-mercapto-4-methylthiazoline, 2-mercapto - 4 - ethylthiazoline, and 2-mercapto-4-methyl-5-ethylthiazoline.

Among the mercaptides are those which may be more particularly illustrated by the following formulae:

(1)

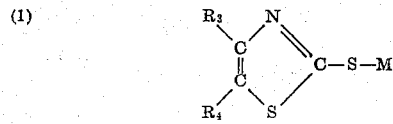

in which each of $R_3$ and $R_4$ is one of a group consisting of hydrogen and alkyl groups; and in which M is one of a group consisting of alkali metals and alkaline earths, examples of which appear hereinabove. Examples of alkyl groups are those containing from 1 to 5 carbon atoms, namely, methyl, ethyl, propyl, butyl, and amyl.

(2)

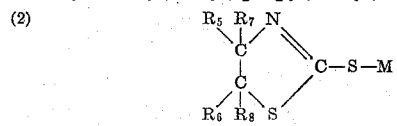

in which each of $R_5$, $R_6$, $R_7$, and $R_8$ has the same meaning as $R_3$ and $R_4$ above, and in which M has the same meaning as above.

(3)

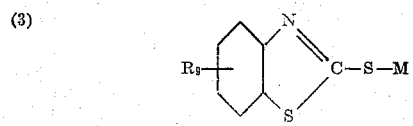

in which $R_9$ represents from 0 to 4 substituents on the phenylene nucleus, selected from the group consisting of halogen, such as chlorine and bromine, nitro, and alkyl, such as methyl, ethyl, propyl, butyl, and amyl, which substituents may be the same or may be different, and in which M has the same meaning as above.

(4)

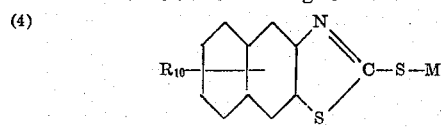

in which $R_{10}$ represents from 0 to 6 (and more particularly 0 to 4) substituents on the naphthylene nucleus selected from the same group as in the case of $R_9$, and in which M has the same meaning as above.

Thus Q may be a vinylene radical having two or more carbon atoms with the points of attachment on adjacent unsaturated carbon atoms as in Formula 1; or an alkylene radical having two or more carbon atoms with the points of attachment on adjacent saturated carbon atoms as in Formula 2; or ortho-arylene as in Formulas 3 and 4.

In conducting the reaction, the thiophosgene is introduced into the reaction zone under conditions such that the other reactants are present in at least stoichiometric amounts, when referred to the thiophosgene. Also the reaction is carried out in the presence of water. The order of addition into the reaction zone of the reactants other than thiophosgene is, generally speaking, relatively unimportant. It is convenient to introduce the mercaptide of the thiazole or thiazoline in aqueous solution into a reaction vessel, and to introduce the inorganic base and the amine into such aqueous solution with agitation, such inorganic base and amine being in aqueous solution or not, as desired. The lower boiling amines are generally soluble in water but solubility in water of the amines is not a necessary criterion. After the mercaptide, the inorganic base and the secondary amine are thoroughly mixed, the thiophosgene is introduced, preferably under conditions of vigorous agitation and progressively. Introduction of thiophosgene is usually stopped when a stoichiometric amount has been introduced, although a greater or lesser amount of thiophosgene may be introduced if desired for any reason.

Under the conditions of reaction just described, it will be noted that the reactants other than thiophosgene are present in at least stoichiometric amount based on thiophosgene during the time that the thiophosgene is being introduced, and that during the larger part or substantially all of the reaction, the reactants other than thiophosgene are present in substantial stoichiometric excess with respect to thiophosgene. While the reactants other than thiophosgene will ordinarily be present in substantially stoichiometric amount with respect to each other, this is not necessary. Thus it might be convenient to operate with an excess of inorganic base to make certain that any thiazole or thiazoline which may be present in mercaptan form is converted to its mercaptide for reaction purposes. Large stoichiometric excesses, with respect to each other, of thiazole or thiazoline on the one hand, and secondary amine on the other hand, are preferably avoided.

It will be understood that the reaction may be conducted in batch, continuously, semi-continuously, or otherwise, as desired, while observing the above principles as to stoichiometric relationships with respect to the thiophosgene present in the reaction. Thus it will be seen that each of the reactants may be metered into a continuous reaction zone in which a high degree of mixing is preferably maintained, and the reaction product continuously withdrawn from such zone.

The amount of water present in the reaction zone during the reaction is not particularly critical, but preferably is at least sufficient to maintain all the water-soluble reactants present in solution. However, it will be understood that if desired for any reason, or should any of the reactants be of fairly limited solubility in water, any one or more of such reactants may be present in undissolved form. Thus, for example, the amount of water by weight in the reaction zone may conveniently be between 200% and 1000% based on the mercaptide present, such as between 300% and 700%.

If desired for any reason, any other liquid solvent or diluent may be present, particularly if substantially inert to the conditions existing in the reaction zone. Any such solvents or diluents are preferably soluble in water, though not necessarily so. Suitable solvents, for example, include the ketones such as acetone, hydrocarbons such as hexane, petroleum naphtha, benzene, toluene, etc. and chlorinated hydrocarbons such as carbon tetrachloride, chlorobenzene, etc.

Reaction usually occurs readily at room temperature, and temperature conditions between 0° C. to 100° C. are quite satisfactory and particularly between 10° C. and 40° C. Temperatures below 0° C. may be employed but frequently are attended by undesirably low reaction velocities and reduced fluidity of the reaction mixtures. Temperatures higher than 100° C. may be employed, but consideration should be given to the thermal stability of the particular reactants being employed as well as of the desired product. It will be understood that, as in substantially all chemical reactions, the rate of reaction may be controlled by change in temperature conditions, and that it is good practice to control temperature conditions so that the reaction proceeds at a reasonable rate, a rate which is either low or very high being frequently avoided. Means for temperature control are well known to persons skilled in the art, and it is merely necessary to point out that reactions of the character herein described tend to be somewhat exothermic in nature and therefore may require some cooling after they have gotten under way. Thus some heat may be applied to get the reaction started, followed by some cooling to prevent temperature conditions from exceeding the chosen value, all of which is well understood by persons skilled in chemical synthesis.

The process may be carried out at atmospheric pressure, although at times the use of subatmospheric or superatmospheric pressures may be resorted to. For example, the use of superatmospheric pressures is often resorted to for preventing loss of one or more reactants which might be volatilized under the particular temperature conditions being employed.

The organic products of the reaction may be readily purified and may be shown by chemical analysis to correspond in empirical formula to the respective arylothiazolyl or other substituted or unsubstituted thiazolyl or thiazolinyl dithiocarbamates.

A wholly unexpected result which flows from the manner in which the reactants are brought together is the extent to which side reactions are suppressed to give good yields of the desired products.

There are many side reactions which are possible, any one or more of which under other circumstances might well be expected to prevail over the desired reaction. Thus, (1) the mercaptide is capable of reacting with the thiophosgene to yield a dithiazyl or dithiazolinyl trithiocarbonate; (2) the secondary amine is capable of reacting with the thiophosgene in the presence of an acid acceptor to yield a tetrasubstituted thiourea; and (3) the thiophosgene is capable of being hydrolyzed, particularly under alkaline conditions, with the formation of carbon oxysulfide.

Under the circumstances the yields obtained in the practice of this invention are quite surprising and are illustrated by the following example.

Sodium hydroxide (80 g., 2 moles) was dissolved in 700 cc. of water, and 2-mercaptobenzothiazole (167 g., 1 mole) was added to the alkaline solution. The mixture was stirred at about 25° C. for 30 minutes. To the resulting solution of the sodium mercaptide there was added 73 g. (1 mole) of diethylamine.

This aqueous solution of the amine and the mercaptide was charged into a 2-liter beaker equipped with a thermometer, cold finger, dropping funnel, and high speed stirrer. The stirrer comprised a stainless steel shaft, at one end of which was a disk one inch in diameter and having sixteen pitched saw teeth giving downward circulation. The stirrer was driven by a high speed electric motor (8000 R. P. M.).

Thiophosgene (115 g., 1 mole) was slowly added to the vigorously stirred solution, temperature conditions being maintained between 25° C. and 30° C. by means of the cold finger. This addition was completed in one hour, and agitation was continued for 30 minutes more.

The crude product, obtained by filtration of the reaction mixture, was dried at 40–45° C. under reduced pressure. It weighed 210 g. and melted at 66–72° C. This material was recrystallized once from methanol. There was thus obtained 2-benzothiazolyl N,N-diethyldithiocarbamate having excellent appearance and a melting point of 78–79.5° C.; literature, 78–79° C. The identity of the product obtained in this experiment was confirmed by a mixed melting point with a known sample.

For purposes of brevity and to avoid needless repetition of examples, it is merely necessary to point out that (1) any other thiazole or any thiazoline of this invention may be substituted for the 2-mercaptobenzothiazole employed in the above example; (2) that any other secondary amine of this invention may be substituted for the diethylamine employed therein; (3) that any other inorganic base of this invention may be substituted for the sodium hydroxide employed therein; and (4) that the same or any other suitable reaction conditions may be employed; all of which will be well understood by persons skilled in the art.

In the foregoing equation illustrating the reactants and reaction products, it was found convenient to write this equation in a manner such that the metal cation of the mercaptide and the metal cation of the base are the same. It will, of course, be understood by persons skilled in the art that there is no need for these metal cations being the same, and that when they are not the same the correction of this equation to illustrate the situation would be obvious. Thus while the use of a sodium mercaptide and sodium hydroxide in a given reaction is convenient, such convenience is more related to the availability of such reactants than to any other consideration.

While in the foregoing equation the inorganic base is illustrated in the form of hydroxide, it will be understood that any hydroxide-yielding substance may be substituted for the hydroxide itself, for example, any corresponding metal oxide.

While in the foregoing example all of the reactants other than thiophosgene were added to the reaction vessel prior to the introduction of the thiophosgene, it will be understood that such other reactants may also be added progressively if desired, provided that the amount of each of such other reactants is maintained in at least stoichiometric relationship to the thiophosgene introduced. It will also be understood that it is highly desirable that the reaction mixture be subjected to intimate mixing during the progress of the reaction.

The products which may be prepared by the practice of this invention are highly effective rubber vulcanization accelerators, which are of particular value because of their delayed action characteristic. In many instances they may, if desired, be employed in the rubber art without purification, other than the removal of inorganic by-products and incidental contaminants such as water and solvent.

It is to be understood that the more particular description given above is by way of illustration, and that various modifications are possible and will occur to persons skilled in the art upon becoming familiar herewith. Accordingly, it is intended that the patent shall cover, by suitable expression in its claims, the features of patentable novelty which reside in the invention.

I claim:

1. A process for the preparation of dithiocarbamic acid derivatives which comprises introducing thiophosgene into an agitated aqueous mixture of other reactants while maintaining in the reaction zone at least a stoichiometric quantity of said other reactants with respect to said thiophosgene, said other reactants being as follows: (1) an inorganic base of a metal of the group consisting of alkali metals and alkaline earths; (2) a compound having the formula

wherein $R_1$ taken individually represents one of the group consisting of alkyl, aralkyl, aryl, and alkaryl radicals; wherein $R_2$ taken individually represents one of the group consisting of alkyl and aralkyl radicals; and wherein $R_1$ and $R_2$ taken collectively represent one of the group consisting of polymethylene and oxapolymethylene radicals; and (3) a compound having the formula

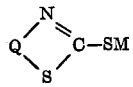

wherein Q represents a bivalent radical attached by adjacent carbon atoms to the N and the S respectively in completion of the characteristic 5-atom heterocyclic ring, said radical being chosen from the group consisting of vinylene, alkylene, and arylene radicals in which radicals each valence normally satisfied by hydrogen is satisfied by one of the group consisting of hydrogen, alkyl, halogen and nitro; and wherein M represents one of the group consisting of alkali metals and alkaline earths; and maintaining said reactants in intimate mutual contact until the desired reaction has occurred.

2. A process for the preparation of thiazolyl dithiocarbamates which comprises introducing thiophosgene into an agitated aqueous mixture of other reactants while maintaining in the reaction zone at least a stoichiometric quantity of said other reactants with respect to said thiophosgene, said other reactants being as follows: (1) an inorganic base of an alkali metal; (2) a dialkyl amine; and (3) an alkali metal mercaptide of a 2-mercaptoarylothiazole; and maintaining said reactants in intimate mutual contact until the desired reaction has occurred.

3. A process for the preparation of thiazolyl dithiocarbamates which comprises introducing thiophosgene into an agitated aqueous mixture of other reactants while maintaining in the reaction zone at least a stoichiometric quantity of said other reactants with respect to said thiophosgene, said other reactants being as follows: (1) an inorganic base of an alkali metal; (2) a dialkyl amine; and (3) an alkali metal mercaptide of 2-mercapto-4,5-dialkyl-2-thiazole; and maintaining said reactants in intimate mutual contact until the desired reaction has occurred.

4. A process for the preparation of thiazolinyl dithiocarbamates which comprises introducing thiophosgene into an agitated aqueous mixture of other reactants while maintaining in the reaction zone at least a stoichiometric quantity of said other reactants with respect to said thiophosgene, said other reactants being as follows: (1) an inorganic base of an alkali metal; (2) a dialkyl amine; and (3) an alkali metal mercaptide of 2-mercapto-4,4,5,5-tetraalkyl-2-thiazoline; and maintaining said reactants in intimate mutual contact until the desired reaction has occurred.

5. The process of claim 1 in which the temperature of the reaction mixture is maintained below 100° C.

6. The process of claim 5 in which temperature conditions are maintained between 10° C. and 40° C.

7. The process of claim 2 wherein the dialkyl amine is diethylamine, and wherein the alkali metal mercaptide of a 2-mercaptoarylothiazole is the sodium mercaptide of 2-mercaptobenzothiazole.

8. The process of claim 2 wherein the inorganic base of an alkali metal is sodium hydroxide, wherein the dialkyl amine is diethylamine, and wherein the alkali metal mercaptide of a 2-mercaptoarylothiazole is the sodium mercaptide of 2-mercaptobenzothiazole.

References Cited in the file of this patent

UNITED STATES PATENTS

| Number | Name | Date |
|---|---|---|
| 2,524,082 | Ritter | Oct. 3, 1950 |

OTHER REFERENCES

Berichte, vol. 20, page 1629.
Richter's, Organic Chemistry, vol. 1, page 490, 3rd ed. (1944).